United States Patent
Baldiga et al.

(10) Patent No.: US 11,248,485 B1
(45) Date of Patent: Feb. 15, 2022

(54) SYSTEMS AND APPARATUS TO CONTROL DEFLECTION MISMATCH BETWEEN STATIC AND ROTATING STRUCTURES

(71) Applicant: General Electric Company, Schenectady, NY (US)

(72) Inventors: Jonathan D. Baldiga, Lynn, MA (US); David W. Bogdan, Lynn, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/995,467

(22) Filed: Aug. 17, 2020

(51) Int. Cl.

| F01D 11/22 | (2006.01) |
|---|---|
| F01D 5/12 | (2006.01) |
| F01D 9/00 | (2006.01) |
| F01D 11/08 | (2006.01) |
| F01D 11/18 | (2006.01) |
| F01D 11/14 | (2006.01) |

(52) U.S. Cl.
CPC .............. *F01D 11/22* (2013.01); *F01D 5/12* (2013.01); *F01D 9/00* (2013.01); *F01D 11/08* (2013.01); *F01D 11/14* (2013.01); *F01D 11/18* (2013.01); F05D 2220/323 (2013.01); F05D 2240/11 (2013.01); F05D 2240/12 (2013.01); F05D 2240/55 (2013.01); F05D 2240/60 (2013.01); F05D 2270/303 (2013.01)

(58) Field of Classification Search
CPC .......... F01D 11/22; F01D 11/24; F01D 11/08; F01D 5/12; F01D 9/00; F01D 25/24; F05D 2240/11; F05D 2240/12; F05D 2240/55; F05D 2240/60; F05D 2270/303; F05D 2220/323

See application file for complete search history.

(56) References Cited

U.S. PATENT DOCUMENTS

| 3,314,648 | A | * | 4/1967 | Werner | .................... F01D 11/08 415/115 |
|---|---|---|---|---|---|
| 4,126,405 | A | * | 11/1978 | Bobo | ...................... F01D 9/042 415/115 |
| 5,228,828 | A | | 7/1993 | Damlis et al. | |
| 6,375,416 | B1 | | 4/2002 | Farrell et al. | |
| 8,100,635 | B2 | * | 1/2012 | Dakowski | ............... F01D 11/24 415/115 |

(Continued)

*Primary Examiner* — Justin D Seabe
*Assistant Examiner* — Ryan C Clark
(74) *Attorney, Agent, or Firm* — Hanley, Flight & Zimmerman, LLC

(57) ABSTRACT

Example apparatus, systems, and articles of manufacture to control deflection mismatch are disclosed herein. Further examples and combinations thereof include: A deflection limiter comprising an inner shroud segment to support a stator structure, the inner shroud segment including a first end face and a first outer upper portion, the first end face positioned radially inward and aft relative to the first outer upper portion, and an outer shroud segment to support the inner shroud segment, the outer shroud segment including a second end face and a second outer upper portion, the second end face positioned aft relative to the first end face and the second outer upper portion positioned aft relative to the first outer upper portion of the inner shroud segment, the second end face coupled to the first end face of the inner shroud segment and the second outer upper portion coupled to the first outer upper portion.

19 Claims, 5 Drawing Sheets

(56) References Cited

U.S. PATENT DOCUMENTS

| | | | |
|---|---|---|---|
| 8,133,018 B2* | 3/2012 | Dakowski | F01D 25/246 |
| | | | 415/209.2 |
| 8,827,651 B2 | 9/2014 | Bottome | |
| 8,944,756 B2 | 2/2015 | Lagueux | |
| 9,903,218 B2 | 2/2018 | Hafner et al. | |
| 9,945,250 B2* | 4/2018 | Kitamura | F02C 7/18 |
| 2011/0293407 A1 | 12/2011 | Wagner | |
| 2017/0016341 A1* | 1/2017 | Stapleton | F01D 9/042 |
| 2017/0218788 A1 | 8/2017 | Zhang et al. | |
| 2019/0017407 A1 | 1/2019 | Duguay | |

\* cited by examiner

SYSTEMS AND APPARATUS TO CONTROL DEFLECTION MISMATCH BETWEEN STATIC AND ROTATING STRUCTURES

STATEMENT REGARDING FEDERALLY SPONSORED RESEARCH OR DEVELOPMENT

This invention was made with government support under W58RGZ-16-C-0047 awarded by the United States Department of Defense. The government has certain rights in the invention.

FIELD OF THE DISCLOSURE

This disclosure relates generally to static and rotating structures, and, more particularly, to control deflection mismatch between static and rotating structures.

BACKGROUND

A gas turbine engine is an internal combustion engine that utilizes air as a working fluid. The gas turbine engine extracts chemical energy from fuel and converts the chemical energy, using the gaseous energy of the working fluid (e.g., air), to mechanical energy. The mechanical energy can be expelled from the gas turbine engine via an exhaust nozzle to provide propulsive jet thrust.

BRIEF SUMMARY

Deflection limiter apparatus systems, and associated methods to control deflection mismatch between static and rotating structures are disclosed.

Certain examples provide an example deflection limiter for controlling deflection mismatch between static and rotating structures. The example deflection limiter includes an inner shroud segment to support a stator structure, the inner shroud segment including a first end face, and an outer shroud segment to support the inner shroud segment, the outer shroud segment including a second end face and a second outer upper portion, the second end face positioned aft relative to the first end face and the second outer upper portion positioned aft relative to the first outer upper portion of the inner shroud segment, the second end face coupled to the first end face of the inner shroud segment and the second outer upper portion coupled to the first outer upper portion.

Certain examples provide an example turbine engine. The example turbine engine includes a compressor, a turbine including a rotor blade and a stator vane, the turbine to receive combustion products from the compressor, and a shroud support system including a first shroud segment coupled to the stator vane, a second shroud segment, and a deflection limiter positioned between the first shroud segment and the second shroud segment.

Figure 1:
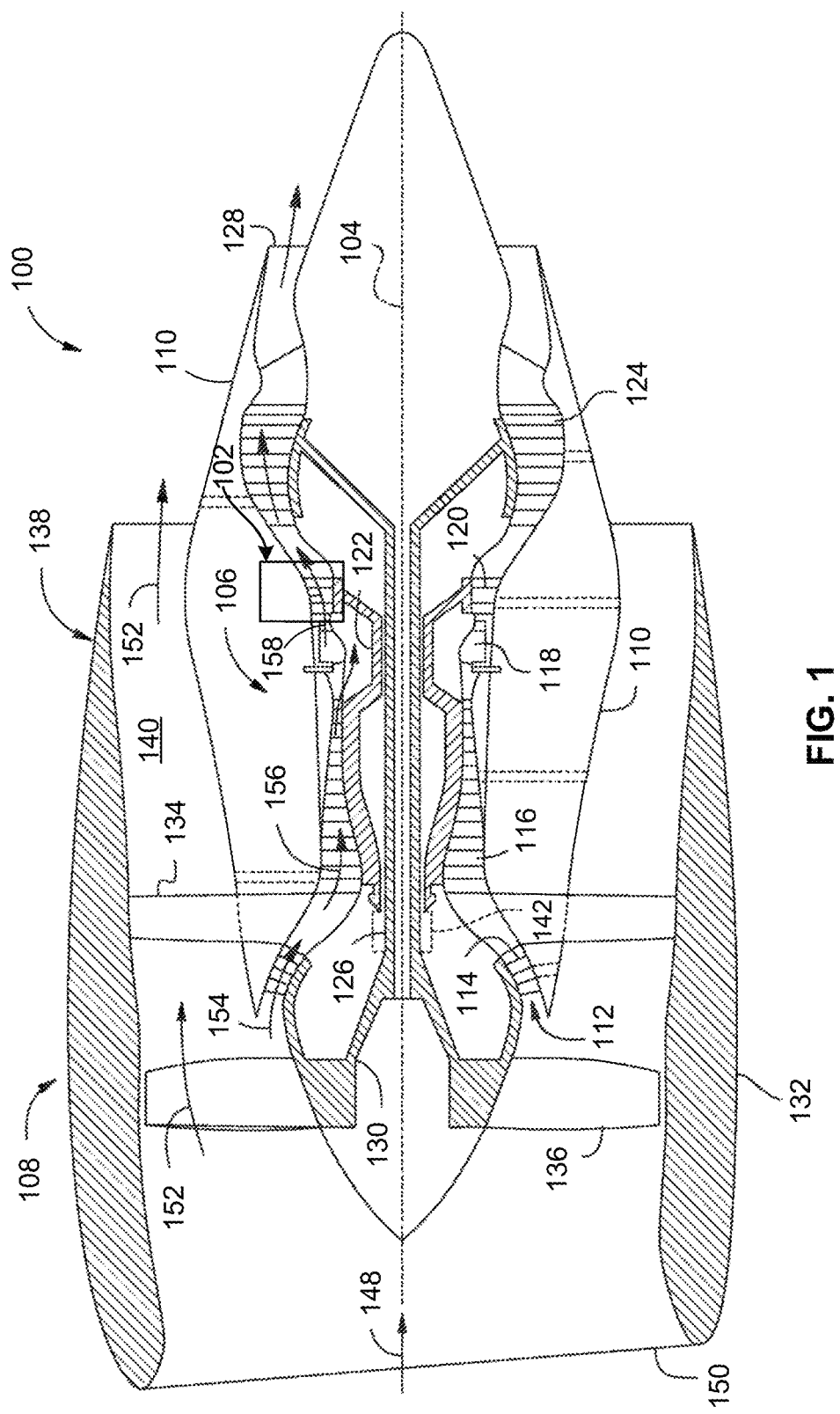
FIG. 1 illustrates an example gas turbine engine that can be utilized within an aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A typical gas turbine engine generally possesses a forward end and an aft end with its several core or propulsion components positioned axially therebetween. An air inlet or intake is located at a forward end of the engine. Moving toward the aft end, in order, the intake is followed by a compressor, a combustion chamber, and a turbine. Additionally, one or more different components may also be included in the engine, such as, for example, low-pressure and high-pressure compressors, and low-pressure and high-pressure turbines. This, however, is not an exhaustive list. Additionally, an engine typically includes an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor to generate hot combustion gases which flow downstream through a plurality of turbine stages. These turbine stages extract energy from the combustion gases. A high pressure turbine first receives the hot combustion gases from the combustor and includes a nozzle assembly directing the combustion gases downstream through a row of high pressure turbine rotor blades extending radially outwardly from a supporting rotor disk. In a two stage turbine, a second stage stator assembly is positioned downstream of the first stage blades followed in turn by a row of second stage rotor blades extending radially outwardly from a second supporting rotor disk. The turbine converts the combustion gas energy to mechanical energy.

Each of the turbines may include one or more stages of rotor blades which extend radially outward from rotor discs. A shroud assembly circumscribes the turbine rotor and defines an outer boundary for combustion gases flowing through the turbine. The turbine shroud may be a single unitary structure or may be formed of a plurality of segments. Some known shroud assemblies include a shroud hanger that is coupled to an outer casing of the engine to provide support to a plurality of shrouds positioned adjacent to, and radially outward of, the tips of the turbine blades. The shrouds can be coupled using a single bolted connection to the shroud hanger, for example.

The shroud is to withstand and be able to function when exposed to the operating temperature and pressure of the turbine engine. For example, the shroud is to be designed for tight radial blade-shroud tip clearances to control leakage flows of the hot combustion gases to the rotor casing and, thus, to improve the flowpath of combustion products. Radial blade-shroud tip clearance corresponds to a clearance between the tip of a rotor blade, extending radially toward the shroud, and the lower portion of the turbine shroud. The clearance between stationary and rotating parts in fluid machinery gives rise to leakage flows, which affect the overall performance of the fluid machinery. In conventional gas turbine engines, the existing gap between the rotor blade tip and the shroud is responsible for a portion of the total aerodynamic losses. Additionally, this leakage flow induces unsteady heat loads onto the rotor casing and provokes significant thermal stresses at the rotor blade tip. Therefore, to reduce or minimize the effects of thermal stresses and unsteady heat loads, it is beneficial to run tight clearances between the blade tip and the shroud.

Examples disclosed herein control thermal deflections of the second stage stators relative to first stage rotor blades to improve flowpath clearances between the blade tip and the shroud. More specifically, examples disclosed herein reduce an axial deflection mismatch between rotor blade angel wings and stator structures (e.g., structures extending axially fore and/or aft from the stator vanes) that are caused by thermal expansion of the stator vane and the shroud. For example, rotor blades include structures referred to as "angel wings." The angel wings extend axially fore and/or aft from the shank to facilitate prevention of ingestion of hot combustion gases into the inner wheel space. In at least some known gas turbine engines, at least two angel wings are provided that extend from an upstream-facing shank wall and/or a downstream-facing shank wall of a rotor blade, such that a first angel wing (hereinafter referred to as a "lower" angel wing) is located radially inward of a second angel wing (hereinafter referred to as an "upper" angel wing). When two angel wings are present and facing in the same direction (e.g., extending from a forward face of a shank), the upper or outermost angel wing facilitates prevention of ingestion of hot combustion gases into a buffer cavity defined between the upper and lower angel wings, and both upper and lower angel wings facilitate prevention of ingestion of hot combustion gases into the inner wheel space. In some examples, the hot combustion gases heat up the shroud assembly and the stator vanes, causing them to thermally expand. When the stator vanes thermally expands, the axial deflection between the rotor blade and the stator vane increases.

In conventional shroud supports, the lower shroud assembly is coupled to a main engine casing of the combustor case and the second stage stator vanes. A consequence of coupling the lower shroud assembly to the engine casing is that thermal expansion of the second stage stators is affected not only by the hot combustion gasses from the first stage rotor blade but also from the thermal expansion of the lower shroud assembly. Examples disclosed herein implement a deflection limiter to minimize and/or reduce the affect that the lower shroud segment introduces to the thermal expansion of the stator vane.

For example, the lower shroud assembly includes a first connection with the engine casing that is forward relative to the second stage stators and a second connection (e.g., the deflection limiter) with the engine casing that is aft of the second stage stator stators. The second connection enables thermal deflections of the lower shroud assembly to come from the aft side and, therefore, push and/or deflect the second stage stators forward. For example, the engine casing is cooler in temperature than the lower shroud assembly, and, therefore, the engine casing may not thermally expand as drastically as the lower shroud assembly. In response to the forward thermal deflection of the lower shroud assembly, axial deflection of the stator structures of the second stage stator vanes are reduced relative to conventional shroud supports that do not include the deflection limiter. Therefore, examples disclosed herein reduce a length of the rotor blade angel wings to accommodate axial deflection of the stator structures.

FIG. 1 illustrates a cross-sectional view of an example gas turbine engine 100 that can be utilized within an aircraft in accordance with aspects of the disclosed examples. The gas turbine engine 100 is shown having a longitudinal or axial centerline axis 104 extending throughout the gas turbine engine 100 for reference purposes. In general, the engine 100 can include a core gas turbine engine 106 and a fan section 108 positioned upstream thereof. The core gas turbine engine 106 can generally include a substantially tubular outer casing 110 that defines an annular inlet 112. In addition, the outer casing 110 can further enclose and support a booster compressor 114 for increasing the pressure of the air that enters the core gas turbine engine 106 to a first pressure level. A high-pressure, multi-stage, axial-flow compressor 116 can then receive the pressurized air from the booster compressor 114 and further increase the pressure of such air to a second pressure level. Alternatively, the high-pressure, multi-stage compressor 116 can be a high-pressure, multi-stage centrifugal compressor or a high-pressure, multi-stage axial-centrifugal compressor.

In the illustrated example of FIG. 1, the pressurized air exiting the high-pressure compressor 116 can then flow to a combustor 118 within which fuel is injected into the flow of pressurized air, with the resulting mixture being combusted within the combustor 118. The high-energy combustion products are directed from the combustor 118 along the hot gas path of the engine 100 to a first (high-pressure) turbine 120 for driving the high-pressure compressor 116 via a first (high-pressure) drive shaft 122, and then to a second (low-pressure) turbine 124 for driving the booster compressor 114 and fan section 108 via a second (low-pressure) drive shaft 126 that is generally coaxial with first drive shaft 122. In the illustrated example of FIG. 1, an example cross-sectional view 102 shows an example shroud assembly and example turbine stages of the first turbine 120. The example cross-sectional view 102 is described in greater detail in conjunction with FIG. 3. After driving each of the turbines 120 and 124, the combustion products can be expelled from the core gas turbine engine 106 via an exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, with each stage including both an annular array of stationary vanes and an annular array of rotating turbine blades positioned immediately downstream of the stationary vanes.

Additionally, as shown in FIG. 1, the fan section 108 of the engine 100 can generally include a rotatable, axial-flow fan rotor assembly 130 that is configured to be surrounded by an annular fan casing 132. The fan casing 132 can be configured to be supported relative to the core gas turbine engine 106 by a plurality of substantially radially-extending, circumferentially-spaced outlet guide vanes 134. As such, the fan casing 132 can enclose the fan rotor assembly 130 and its corresponding fan rotor blades 136. Moreover, a downstream section 138 of the fan casing 132 can extend over an outer portion of the core gas turbine engine 106 to define a secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via a speed reduction device 142 (e.g., a reduction gear or gearbox) to provide an indirect-drive or geared drive configuration. Such a speed reduction device(s) can also be provided between any other suitable shafts and/or spools within the engine 100 as desired or required.

During operation of the engine 100, an initial air flow (indicated by arrow 148) can enter the engine 100 through an associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, combustion products 158 (e.g., hot combustion gases, burning mixture of fuel and air, etc.) exit the combustor 118 and flow through the first turbine 120. Thereafter, the combustion products 158 flow through the second turbine 124 and exit the exhaust nozzle 128 to provide thrust for the engine 100.

During operation, the turbine stages of the first turbine 120 receive the hot combustion products 158 which flow through an outer rotor/stator cavity. The hot combustion products 158 heat up the shroud support and the turbine stages (e.g., the annular array of stationary vanes and the annular array of rotating turbine blades) of the first turbine 120. Therefore, the hot combustion products 158 can cause the shroud support and turbine stages to thermally expand. For example, matter, such as the matter utilized to form the shroud support and the turbine stages, tends to change its shape, area, and volume in response to a change in temperature. In some examples, when the turbine stages and the shroud support of the first turbine 120 thermally expand, the stationary vanes axially deflect relative to the rotating turbine blades. The axial deflection of the stationary vanes relative to the rotating turbine blades can cause leakage of hot combustion gas into an inner wheel space (e.g., the first drive shaft 122) if angel wings of the rotating turbine blades are not long enough to accommodate for the axial deflection. Therefore, the example first turbine 120, and more particularly the shroud support, is to be designed to reduce the relative axial deflection of the stationary vanes.

Figure 2:
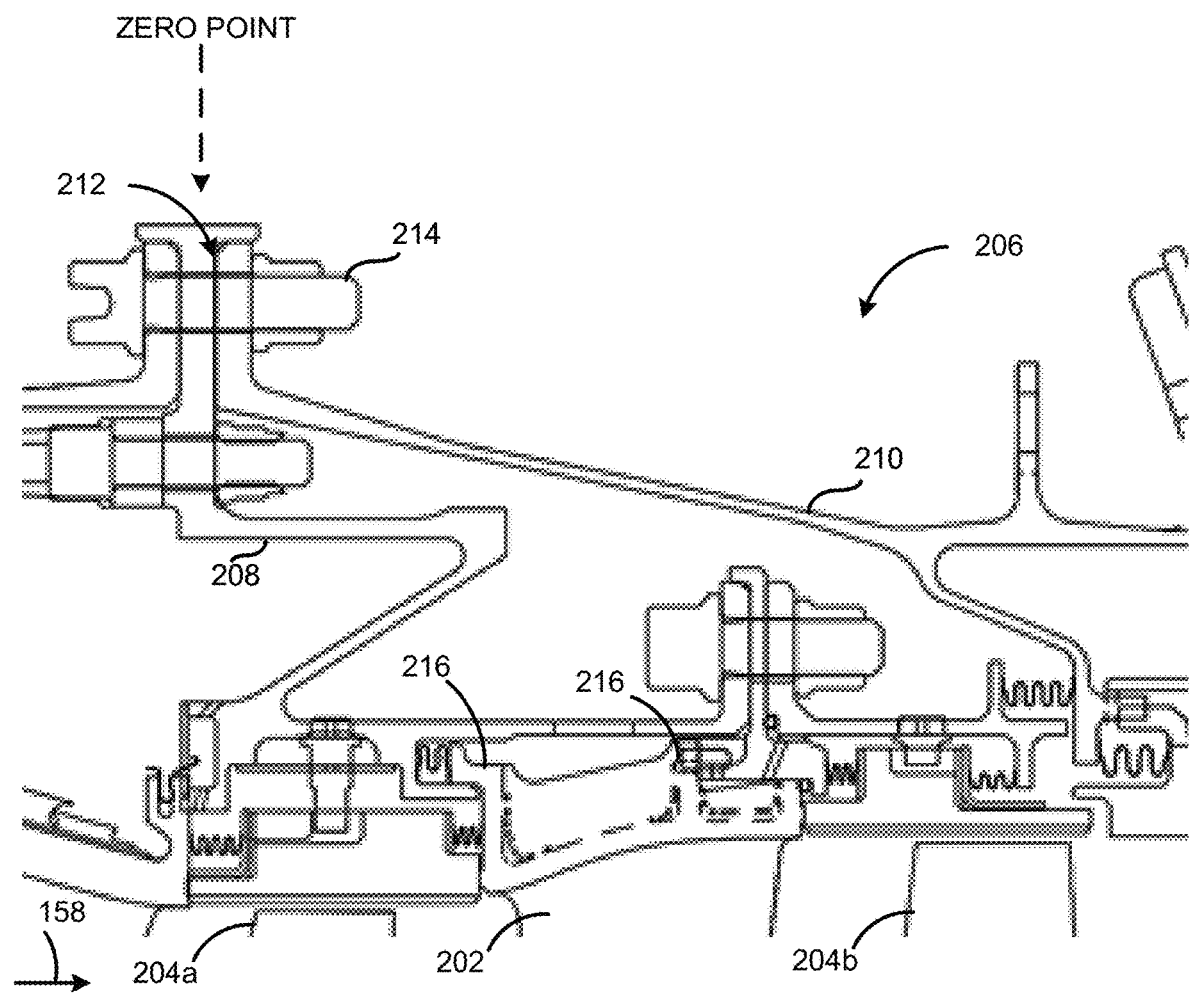
FIG. 2 depicts an example prior art schematic of a prior implementation of a first turbine of FIG. 1.

FIG. 2 depicts an example prior art schematic 200 of a prior implementation of the first turbine 120 of FIG. 1. The turbine 120 includes a stator vane 202, a first blade 204a, and a second blade 204b. Each of the blades 204a, 204b extend radially toward a shroud 206. The shroud 206 extends circumferentially about the centerline axis 104 and includes a first shroud segment 208 and a second shroud segment 210. The first shroud segment 208 includes a flange 212 at an upper portion of the first shroud segment 208. The first shroud segment 208 is connected to the second shroud segment 210 by a bolt 214.

In FIG. 2, the vane 202 includes hooks 216. The hooks 216 are utilized to engage the first shroud segment 208. The shroud 206 is tightly configured relative to the blades 124a, 124b so that the shroud 206 defines an outer radial flowpath boundary for the hot combustion gas (combustion products 158) flowing through the first turbine 120.

During operation, when the hot combustion gases (combustion products 158) flow downstream through the first turbine 120, the combustion products 158 increase the temperature of the components of the first turbine 120 (the vane 202 and the first shroud segment 208). The components (e.g., stator vanes, rotor blades, shroud assembly, etc.) of the first turbine 120 are hot, and, therefore, they will thermally expand. The thermal expansion of the vane 202 can be determined based on the thermal expansion of the first shroud segment 208 relative to the flange 212. In this manner, the thermal expansion of the vane 202 is a sum of the thermal expansion of the first shroud segment 208 and the thermal expansion of the vane 202, thus causing the thermal expansion of the vane 202 to axially deflect aft, relative to the flange 212. In some examples, the axial deflection of the vane 202 increases the distance between the angel wings and the stator structures, enabling purged air and reducing efficiency of the first turbine 120.

Figure 3:
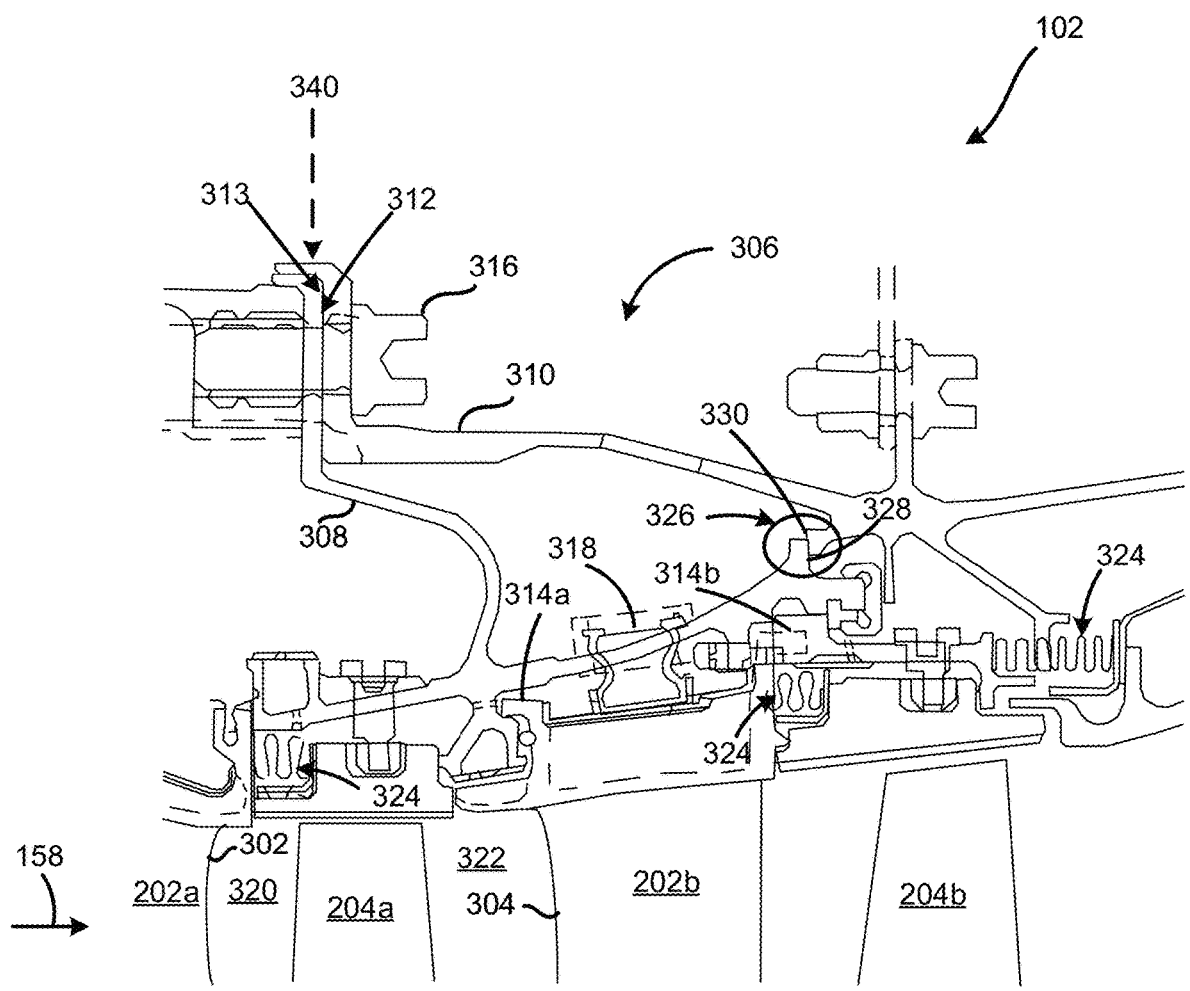
FIG. 3 depicts an example cross-sectional view of the first turbine of FIG. 1.

In contrast to the example of FIG. 2, FIG. 3 depicts another example implementation of the cross-sectional view 102 of the first turbine 120 of FIG. 1. In FIG. 3, the example first turbine 120 includes a first stationary stage 302 and a second stationary stage 304. Each of the stationary stages 302, 304 includes a plurality of circumferentially spaced stationary vanes, such as stationary vanes 202a, 202b. Alternatively, the stationary stages 302, 304 includes a plurality of circumferentially spaces stator structures. A plurality of circumferentially spaced first-stage rotor blades 204a are coupled to a rotor (not shown) downstream of the first stationary stage vanes 202a. Similarly, a plurality of second-stage rotor blades 204a are coupled to a rotor (e.g., the first drive shaft 122), downstream of the second stationary stage vanes 202b, for rotation between second stage stator vanes 304 and a third stage of stator vanes (not shown). Although two stages of rotor blades 204a, 204b and two stationary stages 302, 304 are shown and described herein, a number of stationary and rotor blade stages used to implement the first turbine 120 can vary.

In the example of FIG. 3, the rotor blades 204a, 204b are airfoil-shaped. Each of the blades 204a, 204b extends radially toward a shroud 306. The shroud 306 extends circumferentially about the centerline axis 104 (of the example of FIG. 1) and includes a plurality of shroud segments, such as the first shroud segment 308 and the second shroud segment 310. The first shroud segment 308 can be an inner shroud segment and the second shroud segment 310 can be an outer shroud segment, for example, in which the first shroud segment 308 is located radially inwardly of the second shroud segment 310. The example first shroud segment 308 can be formed from a nickel-based high temperature alloy such as Rene 31, etc. Alternatively, the example first shroud segment 308 can be formed of any high temperature alloy, superalloy, high-performance alloy, etc. The example second shroud segment 310 can be formed from a precipitation-hardened cast superalloy, such as Rene 220, etc. Alternatively, the example second shroud segment 310 can be formed of any superalloy that causes yield strength anomaly. Optionally, the shroud 306 can be formed as one unitary structure. The shroud 306 is tightly configured relative to the blades 204a, 204b so that the shroud 306 defines an outer radial flowpath boundary for the combustion products 158 flowing through the first turbine 120.

In some examples, the second shroud segment 310 can be the outer casing 110 (of the example of FIG. 1). For example, the second shroud segment 310 (or the outer casing 110) extends circumferentially about the centerline axis 104 to provide support to a plurality of shrouds 308 positioned adjacent to, and radially outward of, the tips of the rotor blades 204a, 204b. The example second shroud segment 310 includes an example flange 312 positioned forward relative to the second stationary stage 304, at an outer upper portion of the second shroud segment 310. The example flange 312 includes a bolt aperture to receive a bolt 316. Alternatively, the example flange 312 can include any type of aperture which enables any type of coupling mechanism.

The example first shroud segment 308 may be referred to as the shroud support. For example, the first shroud segment 308 supports the stationary vanes 202a, 202b. For example, the stationary vanes 202b include hooks 314a and 314b, which are utilized to engage the first shroud segment 308. The example hooks 314a and 314b can be of any form or shape to provide a mounting assembly or structure. The example first shroud segment 308 also includes a flange 313 positioned forward relative to the second stationary stage 304, at the outer upper portion of the first shroud segment 308. The flange 313 of the first shroud segment 308 includes a bolt aperture which can receive the bolt 316. Alternatively, the example flange 313 can include any type of aperture which enables any type of coupling mechanism. In this manner, the first shroud segment 308 and the second shroud segment 310 are abutted by the flanges 312 and 313 and bolted together by the bolt 316. Alternatively, the first shroud segment 308 and second shroud segment 310 may be connected by any connection and/or coupling method.

In FIG. 3, the example second stationary stage vane 202b includes a hanger 318 which is connected to the first shroud segment 308 and extends circumferentially about the centerline axis 104 (FIG. 1). Additionally, the example first stationary stage vane 202a includes a hanger (not shown). Hangers (e.g., hanger 318) extend from the radially inward side of the engine casing (e.g., the shroud 306). The hangers (e.g., hanger 318) retain the shroud segments 308 in a circular configuration about the centerline axis 104.

In the illustrated example, each of the rotor blades 204a, 204b further include a plurality of angel wings that extend axially fore and aft from a shank. Angel wings define between them a buffer cavity located radially inward between the angel wings and the first drive shaft 122 (not shown). The example stationary stages 302 and 304 may include stator structures, positioned radially inward of the stationary stages 302, 304. The angelwings of the rotor blades 204a, 204b, along with the stator structures, facilitates prevention of hot combustion gas ingestion into the buffer cavity. Moreover, angel wings cooperate with stator structures, respectively, to help prevent hot combustion gases in the combustion products 158 from being ingested from an outer rotor/stator cavity, into an inner wheelspace (not shown). In some examples, the stationary stages 302, 304 include stator lands, positioned radially inward, to provide clearance to separate the second stationary stage 304 and the first rotor blade 204a while also preventing leakage flow of hot combustion gases from the outer rotor/stator cavity to the inner wheelspace (not shown). In an example, similar cooperating sets of angel wings and stator lands or other structures are provided for each rotor wheel stage and adjacent stationary stage of first turbine 120. In an alternative example, cooperating sets of angel wings and stator lands or other structures are provided at the rotor wheel stage and the adjacent stationary stage of the first turbine 120, or at some (but not all) of the rotor wheel stages and adjacent stationary stages of the first turbine 120. The angel wings of the rotor blades 204a, 204b overlap with the stator lands of the stationary stages 302, 304 in such a manner where the lengths of them never interfere.

Determining the lengths of the angel wings includes considering a flowpath of the combustion products 158 and an amount of purged air. As used herein, purged air is a leakage of combustion products 158 from the rotor/stator cavity into the inner wheelspace (not shown). To control the amount of purged air, the angel wings are sized to accommodate an amount of relative axial and radial deflections between the rotor blades 204a and 204b and the stationary vanes 202a and 202b. The relative axial deflections and the radial deflections correspond to the thermal expansion of the stationary vanes 202a and 202b. For example, when the thermal expansion of the stationary vanes 202a, 202b increases, the axial deflection between the stator landings and the angel wings also increases.

Therefore, it is advantageous to tune the example shroud 306 for durable stator (e.g., stationary vanes 202a, 202b) positioning and, more specifically, to position angelwing deflections of the rotor blades 204a, 204b relative to the stationary vanes 202a, 202b. For example, the shroud 306 can be designed to control the relative thermal expansion of the second stationary stage 304. Controlling and/or reducing the relative thermal expansion of the components of the first turbine 120 enables a reduction in the length of the angel wings, which can result in improved sealing of the shroud 306 and improved durability of the example stationary vanes 202a, 202b, for example.

For example, one or more seals 324 can be provided between faces of the first shroud segment 308 and the second shroud segment 310 that are not in direct contact. These seals 324 can be "spline" seals formed of thin strips of metal or other suitable materials that are inserted in slots in the faces to span the gaps between adjacent shroud segments (e.g., between the first shroud segment 308 and the second shroud segment 310). In some examples, the change in temperature of the shroud segments 308, 310 can affect the sealing between adjacent shroud segments, and/or the seals 324 spanning the gaps between the shroud segments 308, 310 because the seals 324 will change in temperature as the shroud segments 308, 310 change in temperature, thus causing the seals 324 to expand and/or contract. When seals 324 expand and contract, they can reduce in effectiveness (e.g., not containing pressure, not preventing combustion product leakage, etc.). Therefore, examples disclosed herein include an apparatus to minimize the amount of thermal expansion occurring at the shroud segments 308, 310 to maintain effectiveness of the seals 324.

To reduce the amount of relative axial and radial deflections between the rotor blades 204a, 204b and the stationary vanes 202a, 202b, the example first shroud segment 308 and the example second shroud segment 310 can include an example deflection limiter 326. The example deflection limiter 326 includes a first end face 328 of the first shroud segment 308 and a second end face 330 of the second shroud segment 310. The first end face 328 abuts the second end face 330, which creates a second connection at a portion aft of the second stationary stage 304. The second connection enables thermal deflections of the first shroud segment 308 to be directed from the aft side and, therefore, push and/or deflect the second stationary stage 304 forward. For example, the second end face 330 deflects the thermal expansion of the first end face 328 forward relative to a positioning of the first end face 328 and the second end face 330. For example, the second shroud segment 310 is cooler in temperature than the first shroud segment 308. As a result, the second shroud segment 310 may not thermally expand as drastically as the first shroud segment 308. For example, the thermal expansion can be determined from a point 340 (e.g., relative to the flange 312). As used herein, the point 340 can be a zero point at which the thermal expansion of the vane 202b begins. The second shroud segment 310 is a cooler temperature than the first shroud segment 308 because the second shroud segment 310 does not receive as much hot combustion gasses from the combustion products 158 as the first shroud segment 308 receives. At point 340, the thermal expansion of the vane 202b is a sum of the thermal expansion of the first shroud segment 308, the thermal expansion of the second shroud segment 310, and the thermal expansion of the vane 202b. Due to the cooler temperature of the second shroud segment 310, the deflection limiter 326 allows the thermal deflections to come from the aft side and push (e.g., thermally expand) the second stationary stage 304 forward relative to this deflection limiter 326. The forward thermal deflection of the second stationary stage 304 reduces or minimizes an axial deflection between the first rotor blade 204a and the second vane 202b.

In response to forward thermal deflection of the second stationary stage 202b relative to the deflection limiter 326, the relative axial deflection of the stage stator lands from the first stage rotor blade 204a blade are reduced compared to the axial deflections of the vane 202 relative to the blade 204 of FIG. 2.

Based on the reduction in relative axial deflection, the length of the angel wings can be reduced because the angel wings no longer are to accommodate the axial deflection of the second stationary stage 304. Additionally, reducing axial and/or radial deflection of the first shroud segment 308 and the second stationary stage 304 enables tighter running clearances between the rotor blade tips and the first shroud segment 308. In response to tighter running clearances, purged air is reduced and the efficiency of the first turbine 120 is improved. Additionally, reducing the relative deflections allows for angelwing length reduction, reduced weight of the stator vanes 202a, 202b and the rotor blades 204a, 204b, and improved durability of the first turbine 120, for example.

Figure 4:
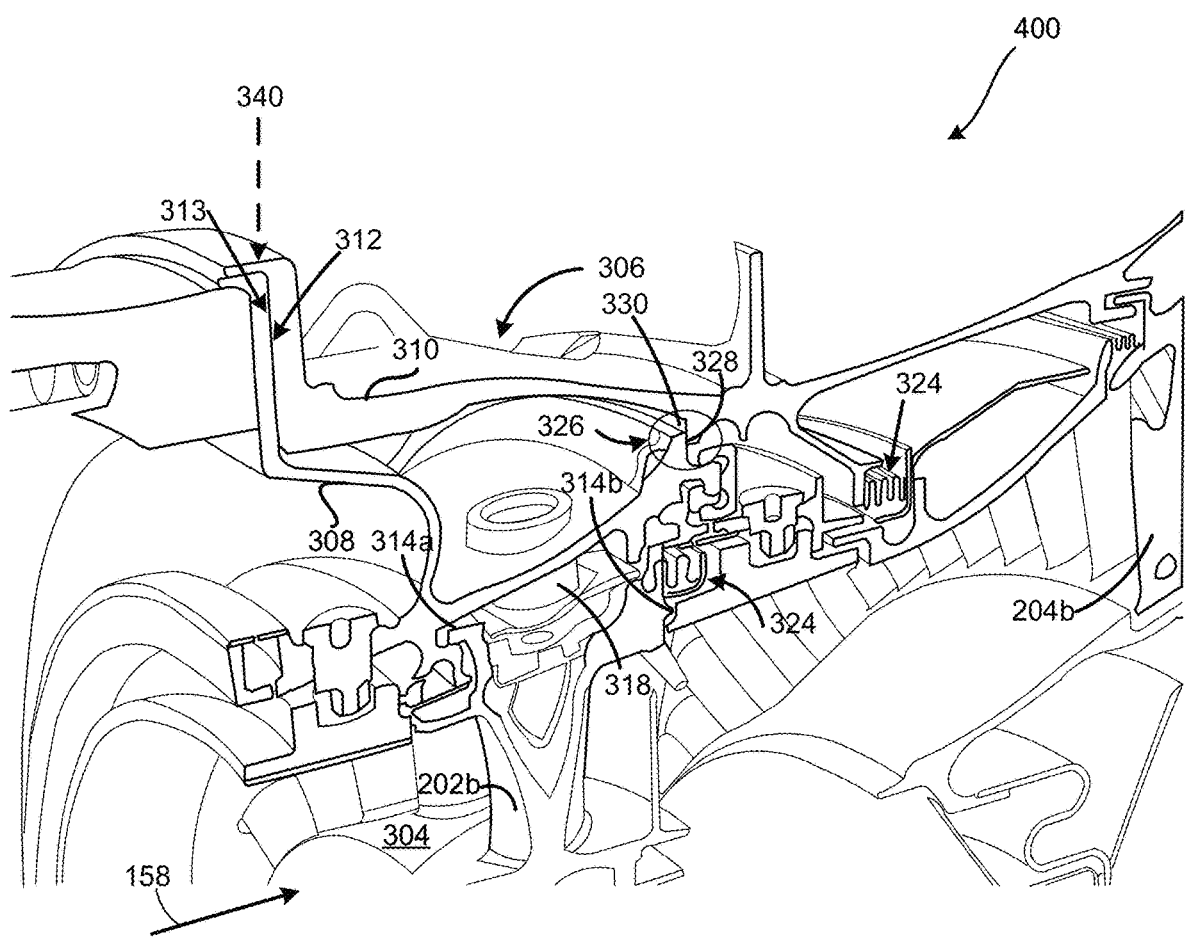
FIG. 4 depicts an example cross-sectional isometric view of the first turbine of FIG. 3.

FIG. 4 illustrates an example cross-sectional isometric view 400 of the first turbine 120 of FIG. 3 depicting the example deflection limiter 326. In FIG. 4, the first shroud segment 308 includes the first end face 328 extending circumferentially about the axial centerline axis 104. The second shroud segment 310 includes the second end face 330 extending circumferentially about the axial centerline axis 104. The first end face 328 abuts the second end face 330 to form the deflection limiter 326.

In operation, the second shroud segment 310 is not in direct contact with the combustion products 158, and, therefore, has a lower thermal expansion relative to the first shroud segment 308. As illustrated, the first shroud segment 308 is coupled to the second vane 202b via hooks 314a, 314b. The second vane 202b is in direct contact with the combustion products 158 during operation, and thus increases in temperature. Thus, the first shroud segment 308 increases in temperature, and both the second vane 202b and the first shroud segment 308 thermally expand. During the thermal expansion of the second vane 202b and the first shroud segment 308, the deflection limiter 326 pushes (e.g., thermally deflects) the second vane 202b forward relative to this deflection limiter 326. For example, the second end face 330 includes a forward force (e.g., a thermal deflection) that pushes the first end face 328 forward when the first end face 328 thermally expands aft relative to the second vane 202b. The forward thermal deflection of the second vane 202b reduces or minimizes the axial deflection between the second rotor blade 204a and the second vane 202b.

Figure 5:
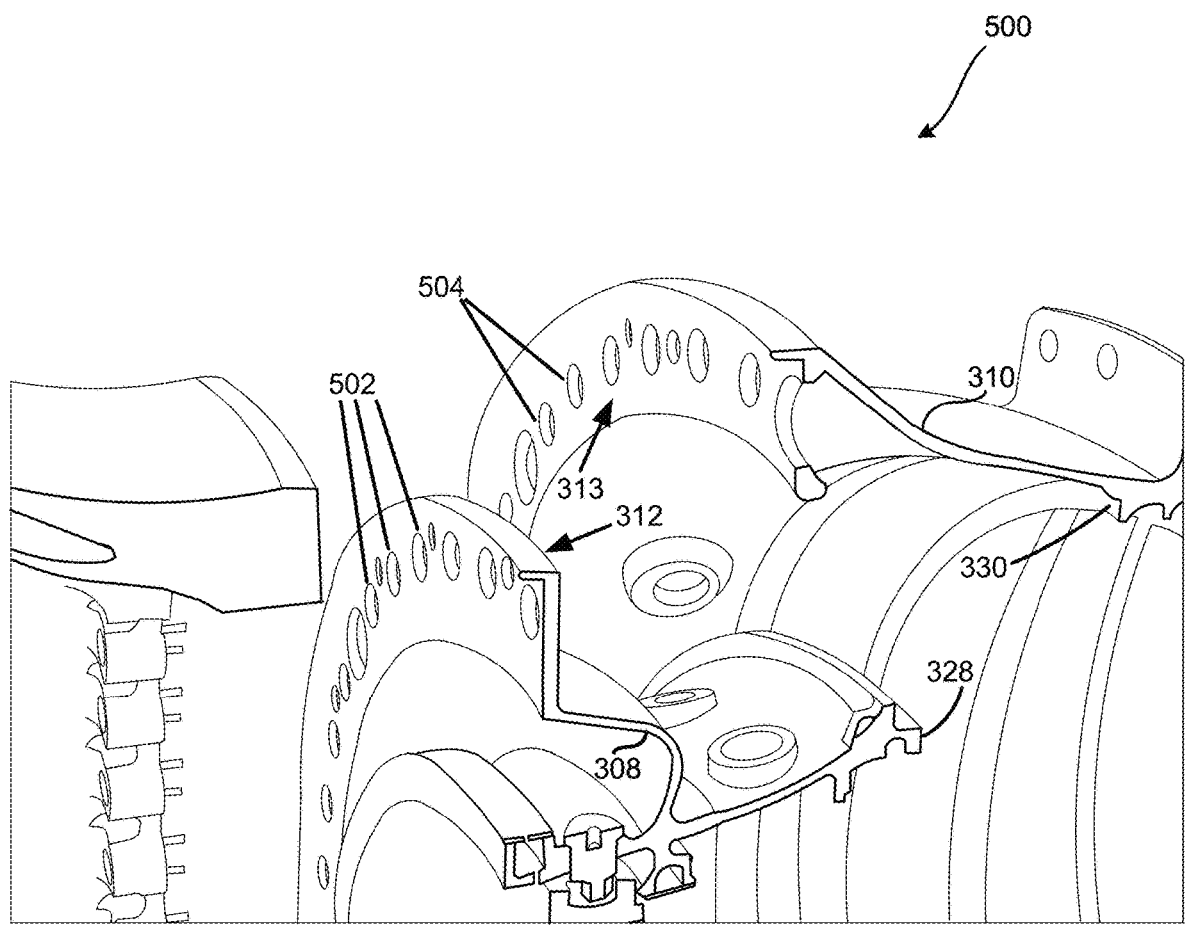
FIG. 5 illustrates an example partially assembled view of the first turbine of FIG. 3 and FIG. 4.

FIG. 5 illustrates an example partially assembled view 500 of the first turbine 120 of FIG. 3 depicting the first shroud segment 308 disconnected from the second shroud segment 310. In FIG. 5, the first shroud segment 308 includes the first flange 312 having one or more first openings 502. In some examples, the first openings 502 can be bolt apertures to receive the example bolt 316 of FIG. 3. Alternatively, the first openings 502 can be threads to receive screws, pin holes to receive pins, or other type of opening to receive coupling hardware that couples the first flange 312 to the second flange 313.

In FIG. 5, the second shroud segment 310 includes the second flange 313 having one or more second openings 504. In some example, the second openings 504 may be bolt apertures to receive the example bolt 316 bolt of FIG. 3. Alternatively, the second openings 504 may be threads to receive screws, pin holes to receive pins, or any other type of opening to receive any type of coupling hardware that couples the first flange 312 to the second flange 313.

In some examples, when the first flange 312 and the second flange 313 are abutted and coupled together via one or more bolts 316, the example first end face 328 and the example second end face 330 are abutted. In some examples, the first end face 328 is a flange and the second end face 330 is a flange. In some examples, the first end face 328 is a portion of the deflection limiter (e.g., the deflection limiter 326) and the second end face 330 is a portion of the deflection limiter. As mentioned above, when the first flange 312 and the second flange 313 are abutted and coupled together via one or more bolts 316, the example first end face 328 and the example second end face 330 are abutted. The contact between the first end face 328 and the second end face 330 create the deflection limiter (e.g., the deflection limiter).

In FIG. 5, the seals 324 are not shown. In some examples, the seals 324 are to span the gaps between adjacent shroud segments (e.g., the first shroud 308 and the second shroud 310) when the first flange 312 and the second flange 313 are abutted and coupled together via one or more bolts 316.

From the foregoing, it will be appreciated that example systems and apparatus have been disclosed that implement a deflection limiter within a turbine shroud assembly to control the thermal expansion and therefore, the relative axial deflections of the stator vanes relative to rotor blades in a turbine. The deflection limiter pushes the stator vane(s) forward to minimize the axial deflection of the stator vane(s) relative to the rotor blade. By minimizing the axial deflection of the stator vane(s), examples disclosed herein facilitate tighter running clearances between static and rotating parts, reduced purged air, and improved turbine efficiency. By reducing purged air, the deflection limiter allows angel wing lengths to reduce in length, which results in tighter running clearances between static and rotating parts.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

1. A deflection limiter comprising an inner shroud segment to support a stator structure, the inner shroud segment including a first end face and a first outer upper portion, the first end face positioned radially inward and aft relative to the first outer upper portion, and an outer shroud segment to support the inner shroud segment, the outer shroud segment including a second end face and a second outer upper portion, the second end face positioned aft relative to the first end face and the second outer upper portion positioned aft relative to the first outer upper portion of the inner shroud segment, the second end face coupled to the first end face of the inner shroud segment and the second outer upper portion coupled to the first outer upper portion.

2. The deflection limiter of any preceding clause, wherein the coupling of the first outer upper portion of the inner shroud segment and the second outer upper portion of the outer shroud segment is positioned forward relative to the coupling of the first end face and the second end face.

3. The deflection limiter of any preceding clause, wherein the outer shroud segment includes a first flange at the second outer upper portion coupled to a second flange of the inner shroud segment.

4. The deflection limiter of any preceding clause, wherein the outer shroud segment is to operate at a first temperature less than a second temperature of the inner shroud segment.

5. The deflection limiter of any preceding clause, wherein the outer shroud segment is to push the inner shroud segment forward relative to the outer shroud segment when the inner shroud segment thermally expands.

6. The deflection limiter of any preceding clause, wherein the first end face is forward relative to the second end face and adjacent to the second end face.

7. The deflection limiter of any preceding clause, wherein a thermal expansion of the stator structure corresponds to a sum of the thermal expansion of the stator structure, a thermal expansion of the inner shroud segment, and a thermal deflection of the outer shroud segment, the thermal deflection of the outer shroud segment reducing the thermal expansion of the stator structure.

8. The deflection limiter of any preceding clause, wherein the inner shroud segment and the outer shroud segment extend circumferentially about an axial centerline axis, the axial centerline axis corresponding to a longitudinal axis of a center of a gas turbine engine.

9. A turbine engine comprising a compressor, a turbine including a rotor blade and a stator vane, the turbine to receive combustion products from the compressor, and a shroud support system including a first shroud segment coupled to the stator vane, a second shroud segment, and a deflection limiter positioned between the first shroud segment and the second shroud segment.

10. The turbine engine of any preceding clause, wherein the deflection limiter includes a first end face of the first shroud segment coupled to a second end face of the second shroud segment, the coupling of the first end face to the second end face positioned aft relative to the stator vane.

11. The turbine engine of any preceding clause, wherein the turbine includes a first stage of rotor blades downstream from a first stage of stator vanes and a second stage of rotor blades downstream from a second stage of stator vanes, the deflection limiter positioned between the second stage of stator vanes and the second stage of rotor blades.

12. The turbine engine of any preceding clause, wherein the rotor blade includes two or more angel wings extending forward of a rotor blade shaft and aft of the rotor blade shaft.

13. The turbine engine of any preceding clause, wherein the stator vane includes two or more stator structures extending forward of a stator vane shaft towards the two or more angel wings of the rotor blade shaft and aft of the stator vane shaft towards the two or more angel wings of the rotor blade shaft, a distance between the two or more stator structures and the two or more angel wings reduced relative to a turbine engine missing the deflection limiter.

14. The turbine engine of any preceding clause, wherein the deflection limiter includes a first end face of the first shroud segment coupled to a second end face of the second shroud segment, when the turbine receives the combustion products from the compressor, the second end face is to deflect a thermal expansion of the first end face forward, relative to a positioning of the first end face and the second end face.

15. The turbine engine of any preceding clause, wherein the stator vane thermally expands forward relative to the positioning of the first end face and the second end face when the second end face deflects the thermal expansion of the first end face forward, the forward thermal expansion of the stator vane is to minimize an axial deflection between the rotor blade and the stator vane.

16. The turbine engine of any preceding clause, wherein the rotor blade includes a rotor blade tip and the turbine engine further includes a shroud-tip clearance between an inner portion of the first shroud segment and the rotor blade tip, a size of the shroud-tip clearance controlled by the deflection limiter.

17. The turbine engine of any preceding clause, wherein the shroud support system further includes one or more seals between gaps of adjacent shroud segments to seal the gaps between the adjacent shroud segments.

18. The turbine engine of any preceding clause, wherein the first shroud segment of the shroud support system is an inner shroud segment and further includes a first end face and a first outer upper portion, the first end face positioned radially inward and aft relative to the first outer upper portion.

19. The turbine engine of any preceding clause, wherein the second shroud segment of the shroud support system is an outer shroud segment and further includes a second end face and a second outer upper portion, the second end face positioned aft relative to the first end face and the second outer upper portion positioned aft relative to the first outer upper portion of the inner shroud segment, the second end face coupled to the first end face of the inner shroud segment and the second outer upper portion coupled to the first outer upper portion.

20. The turbine engine of any preceding clause, wherein the coupling of the first outer upper portion of the inner shroud segment and the second outer upper portion of the outer shroud segment is positioned forward relative to the coupling of the first end face and the second end face.

The following claims are hereby incorporated into this Detailed Description by this reference, with each claim standing on its own as a separate embodiment of the present disclosure.

What is claimed is:

1. A deflection limiter comprising:
an inner shroud segment to support a stator structure, the inner shroud segment including a first end face and a first outer upper portion, the first end face positioned radially inward and aft relative to the first outer upper portion; and
an outer shroud segment to support the inner shroud segment, the outer shroud segment including a second end face and a second outer upper portion, the second end face positioned aft relative to the first end face and the second outer upper portion positioned aft relative to the first outer upper portion of the inner shroud segment, the second end face coupled to the first end face of the inner shroud segment and the second outer upper portion coupled to the first outer upper portion.

2. The deflection limiter of claim 1, wherein the coupling of the first outer upper portion of the inner shroud segment and the second outer upper portion of the outer shroud segment is positioned forward relative to the coupling of the first end face and the second end face.

3. The deflection limiter of claim 1, wherein the outer shroud segment includes a first flange at the second outer upper portion coupled to a second flange of the inner shroud segment.

4. The deflection limiter of claim 1, wherein the outer shroud segment is to operate at a first temperature less than a second temperature of the inner shroud segment.

5. The deflection limiter of claim 1, wherein the outer shroud segment is to push the inner shroud segment forward relative to the outer shroud segment when the inner shroud segment thermally expands.

6. The deflection limiter of claim 1, wherein the first end face is:
forward relative to the second end face; and
adjacent to the second end face.

7. The deflection limiter of claim 1, wherein a thermal expansion of the stator structure corresponds to a sum of the thermal expansion of the stator structure, a thermal expansion of the inner shroud segment, and a thermal deflection of the outer shroud segment, the thermal deflection of the outer shroud segment reducing the thermal expansion of the stator structure.

8. The deflection limiter of claim 1, wherein the inner shroud segment and the outer shroud segment extend circumferentially about an axial centerline axis, the axial centerline axis corresponding to a longitudinal axis of a center of a gas turbine engine.

9. A turbine engine comprising: a compressor; a turbine including a rotor blade and a stator vane, the turbine to receive combustion products from the compressor; and a shroud support system including a first shroud segment coupled to the stator vane, a second shroud segment, and a deflection limiter positioned between the first shroud segment and the second shroud segment, wherein the deflection limiter includes a first end face of the first shroud segment coupled to a second end face of the second shroud segment, the coupling of the first end face to the second end face positioned aft relative to the stator vane.

10. The turbine engine of claim 9, wherein the turbine includes a first stage of rotor blades downstream from a first stage of stator vanes and a second stage of rotor blades downstream from a second stage of stator vanes, the deflection limiter positioned between the second stage of stator vanes and the second stage of rotor blades.

11. The turbine engine of claim 9, wherein the rotor blade includes two or more angel wings extending forward of a rotor blade shaft and aft of the rotor blade shaft.

12. The turbine engine of claim 11, wherein the stator vane includes two or more stator structures extending forward of a stator vane shaft towards the two or more angel wings of the rotor blade shaft and aft of the stator vane shaft towards the two or more angel wings of the rotor blade shaft, a distance between the two or more stator structures and the two or more angel wings reduced relative to a turbine engine missing the deflection limiter.

13. The turbine engine of claim 9, wherein the deflection limiter includes a first end face of the first shroud segment coupled to a second end face of the second shroud segment, when the turbine receives the combustion products from the compressor, the second end face is to deflect a thermal expansion of the first end face forward, relative to a positioning of the first end face and the second end face.

14. The turbine engine of claim 13, wherein the stator vane thermally expands forward relative to the positioning of the first end face and the second end face when the second end face deflects the thermal expansion of the first end face forward, the forward thermal expansion of the stator vane is to minimize an axial deflection between the rotor blade and the stator vane.

15. The turbine engine of claim 9, wherein the rotor blade includes a rotor blade tip and the turbine engine further includes a shroud-tip clearance between an inner portion of the first shroud segment and the rotor blade tip, a size of the shroud-tip clearance controlled by the deflection limiter.

16. The turbine engine of claim 9, wherein the shroud support system further includes one or more seals between gaps of adjacent shroud segments to seal the gaps between the adjacent shroud segments.

17. The turbine engine of claim 9, wherein the first shroud segment of the shroud support system is an inner shroud segment and further includes a first end face and a first outer upper portion, the first end face positioned radially inward and aft relative to the first outer upper portion.

18. The turbine engine of claim 17, wherein the second shroud segment of the shroud support system is an outer shroud segment and further includes a second end face and a second outer upper portion, the second end face positioned aft relative to the first end face and the second outer upper portion positioned aft relative to the first outer upper portion of the inner shroud segment, the second end face coupled to the first end face of the inner shroud segment and the second outer upper portion coupled to the first outer upper portion.

19. The turbine engine of claim 18, wherein the coupling of the first outer upper portion of the inner shroud segment and the second outer upper portion of the outer shroud segment is positioned forward relative to the coupling of the first end face and the second end face.

* * * * *